US 6,566,864 B1

(12) United States Patent
Brown et al.

(10) Patent No.: US 6,566,864 B1
(45) Date of Patent: May 20, 2003

(54) ANGULAR POSITION SENSOR FOR VEHICLE SUSPENSION

(75) Inventors: Todd A. Brown, Elkhart, IN (US); Duncan Wang, Troy, MI (US)

(73) Assignees: Ford Global Technologies, L.L.C., Dearborn, MI (US); American Electronic Components, Elkhart, IN (US)

(*) Notice: Subject to any disclaimer, the term of this patent is extended or adjusted under 35 U.S.C. 154(b) by 0 days.

(21) Appl. No.: 09/653,507

(22) Filed: Sep. 1, 2000

(51) Int. Cl.[7] .............................. G01B 7/30; G01B 7/14; B60G 17/00
(52) U.S. Cl. ..................... 324/207.2; 324/207.22; 324/207.24; 324/207.25; 280/6.15
(58) Field of Search ................... 324/207.2–207.26; 73/DIG. 3; 901/15, 16, 46; 33/1 PT, 1 N; 280/6.15, 6.151, 6.157, 6.159, DIG. 1

(56) References Cited

U.S. PATENT DOCUMENTS

| | | | | |
|---|---|---|---|---|
| 3,751,061 A | * | 8/1973 | Scheuerpflug | ....... 280/6.157 X |
| 3,779,581 A | * | 12/1973 | Scheuerpflug | ....... 280/6.155 X |
| 4,349,735 A | * | 9/1982 | Maeda | ................ 280/6.15 X |
| 4,642,496 A | * | 2/1987 | Kerviel et al. | |
| 4,756,374 A | * | 7/1988 | Bailey et al. | |
| 4,838,563 A | * | 6/1989 | Konishi et al. | ............ 280/6.15 |
| 4,961,650 A | * | 10/1990 | Schwarzbich | |
| 5,031,934 A | * | 7/1991 | Soltis | ..................... 280/6.157 |
| 5,253,735 A | * | 10/1993 | Larson et al. | ........ 324/207.2 X |
| 5,497,081 A | * | 3/1996 | Wolf et al. | ......... 324/207.25 X |
| 5,573,263 A | * | 11/1996 | Denny et al. | |
| 5,922,953 A | * | 7/1999 | Payne et al. | |
| 6,126,177 A | * | 10/2000 | Steinert | ............. 280/DIG. 1 X |
| 6,232,771 B1 | * | 5/2001 | Herden et al. | ....... 324/207.2 X |
| 6,293,511 B1 | * | 9/2001 | Shepherd | |

FOREIGN PATENT DOCUMENTS

| | | | | |
|---|---|---|---|---|
| GB | 2143328 A | * | 2/1985 | .............. 324/207.2 |
| JP | 4-20812 A | * | 1/1992 | .............. 324/207.2 |

* cited by examiner

Primary Examiner—Gerard R. Strecker
(74) Attorney, Agent, or Firm—Gregory P. Brown

(57) ABSTRACT

A rotary position sensing assembly (10) includes a sensor (12) that monitors angular position, and which is fixedly attached to a first member (14), and a first arm (16) having a first end (18) pivotally attached to the sensor (12) and a second end (22) including a first portion (24) of a universal joint (26). The rotary position sensing assembly (10) also includes a second arm (28) having a first end (30) that includes a second portion (32) of the first universal joint (26) pivotally attached to the first portion (24) of the first universal joint (26), and a second end (34), including a first portion (36) of a second universal joint (38). The rotary position sensor assembly (10) further includes a second portion (40) of the second universal joint (38) fixedly attached to a second member (42) and pivotally attached to the first portion (40) of the second universal joint (38). The sensor (12) monitors the distance between the first member (14) and the second member (42) by monitoring the angular position of the first arm (16).

6 Claims, 5 Drawing Sheets

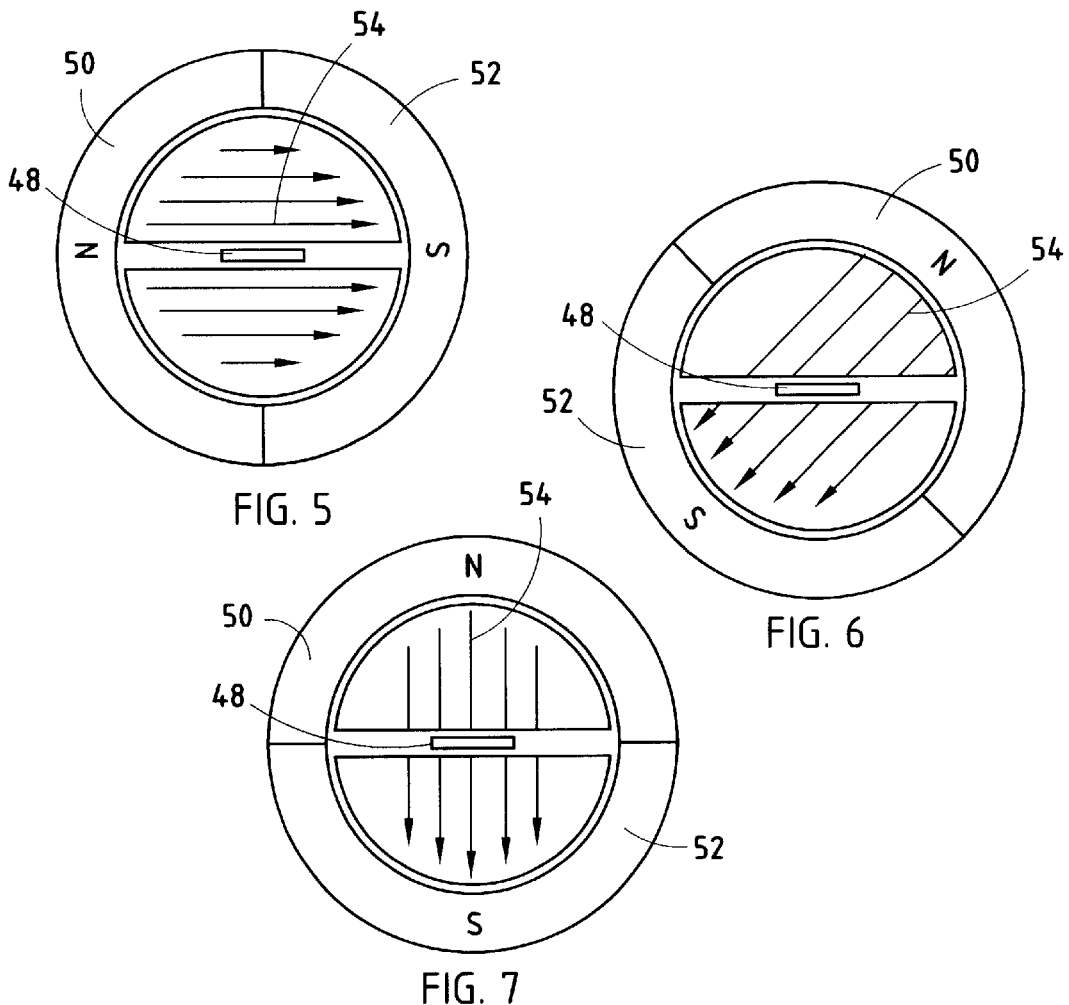
FIG. 5
FIG. 6
FIG. 7
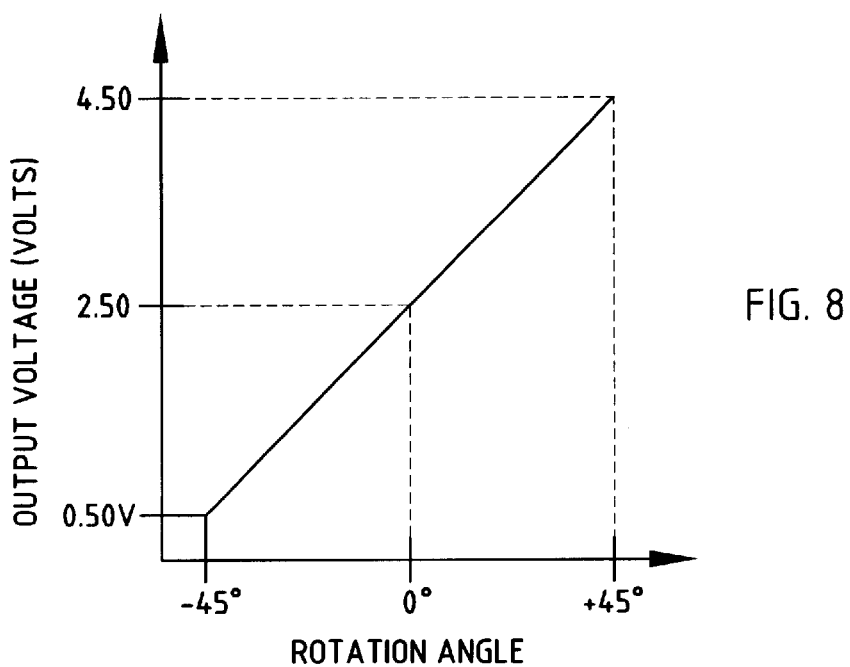
FIG. 8

US 6,566,864 B1

ANGULAR POSITION SENSOR FOR VEHICLE SUSPENSION

FIELD OF THE INVENTION

The present invention relates to an apparatus for monitoring the relative position between two objects, and in particular, to an apparatus for monitoring the position of a vehicle suspension system with respect to a vehicle body.

BACKGROUND OF THE INVENTION

Position sensors are frequently used in a wide variety of applications, such as determining the relative movement of a vehicle suspension system with respect to a supported vehicle body. Conventional suspension-type position sensors typically include a linear-type motion sensor that utilize capacitor plates or an inductor to determine the distance between a component of the vehicle suspension system and the vehicle body.

Heretofore, the sensors and the mechanical linkages used in connection therewith to determine the relative movement of a vehicle suspension system with respect to a vehicle body have been limited by the construction being placed within the respective vehicle in a location which provides only linear travel of the vehicle suspension system with respect to the vehicle body. These placement limitations are a result of not only the construction of the sensor itself, but also of the mechanical linkages used to connect the sensor to a component of the vehicle suspension system and a component of the vehicle body.

SUMMARY OF THE INVENTION

One aspect of the present invention is to provide an apparatus for monitoring angular position that includes a sensor that monitors angular position and that is fixedly attached to a first member, and a first arm having a first end pivotally attached to the sensor, and a second end including a first portion of a first universal joint. The apparatus also includes a second arm having a first end including a second portion of the first universal joint pivotally attached to the first portion of the first universal joint, and a second end including a first portion of a second universal joint. The apparatus further includes a second portion of the second universal joint which is fixedly attached to a second member and pivotally attached to the first portion of the second universal joint. The sensor monitors the distance between the first member and the second member by monitoring the angular position of the first arm.

Another aspect of the present invention is to provide an apparatus for monitoring the position of the vehicle suspension, the apparatus including a sensor that monitors angular position, and a first arm rotatable with respect to the sensor, and having a first end pivotally attached to a first member, and a second end. The apparatus also includes a second arm having a first end pivotally attached to the second end of the first arm, and a second end pivotally attached to a second member. The sensor monitors the distance between the first member and the second member by monitoring the angular position of the first arm.

Yet another aspect of the present invention is to provide an apparatus for monitoring the position of a vehicle suspension, the apparatus including a sensor that monitors angular position being fixedly attached to one of a portion of a vehicle body and a portion of a vehicle suspension system, and a first arm having a first end pivotally attached to the sensor, and a second end including a first ball. The apparatus also includes a second arm having a first end including a socket pivotally receiving the first ball, and a second end including a second socket, and a second ball fixedly attached to the other of the portion of the vehicle body and the portion of the vehicle suspension system not connected to the sensor, the second ball pivotally received with the first socket. The sensor monitors the distance between the portion of the vehicle body and the portion of the vehicle suspension system by monitoring the angular position of the first arm.

The apparatus of the present invention provides a sensing system that is economical to manufacture, includes an uncomplicated design, is capable of a long operating life, and is particularly well adapted for the proposed use.

These and other advantages of the invention will be further understood and appreciated by those skilled in the art by reference to the following written specifications, claims and appended drawings.

BRIEF DESCRIPTION OF THE DRAWINGS

In the drawings:

FIG. 5 is a schematic view of the Hall-effect type sensor with the magnets associated with the sensor located in a 0° position;

FIG. 6 is a schematic view of the Hall-effect type sensor with the magnets associated with the sensor located in a 45° position;

FIG. 7 is a schematic view of the Hall-effect type sensor with the magnets associated with the sensor located in a 90° position;

FIG. 8 is a graphical representation of output voltage versus rotational angle of the Hall-effect type sensor.

DETAILED DESCRIPTION OF THE PREFERRED EMBODIMENT(S)

Figure 1:
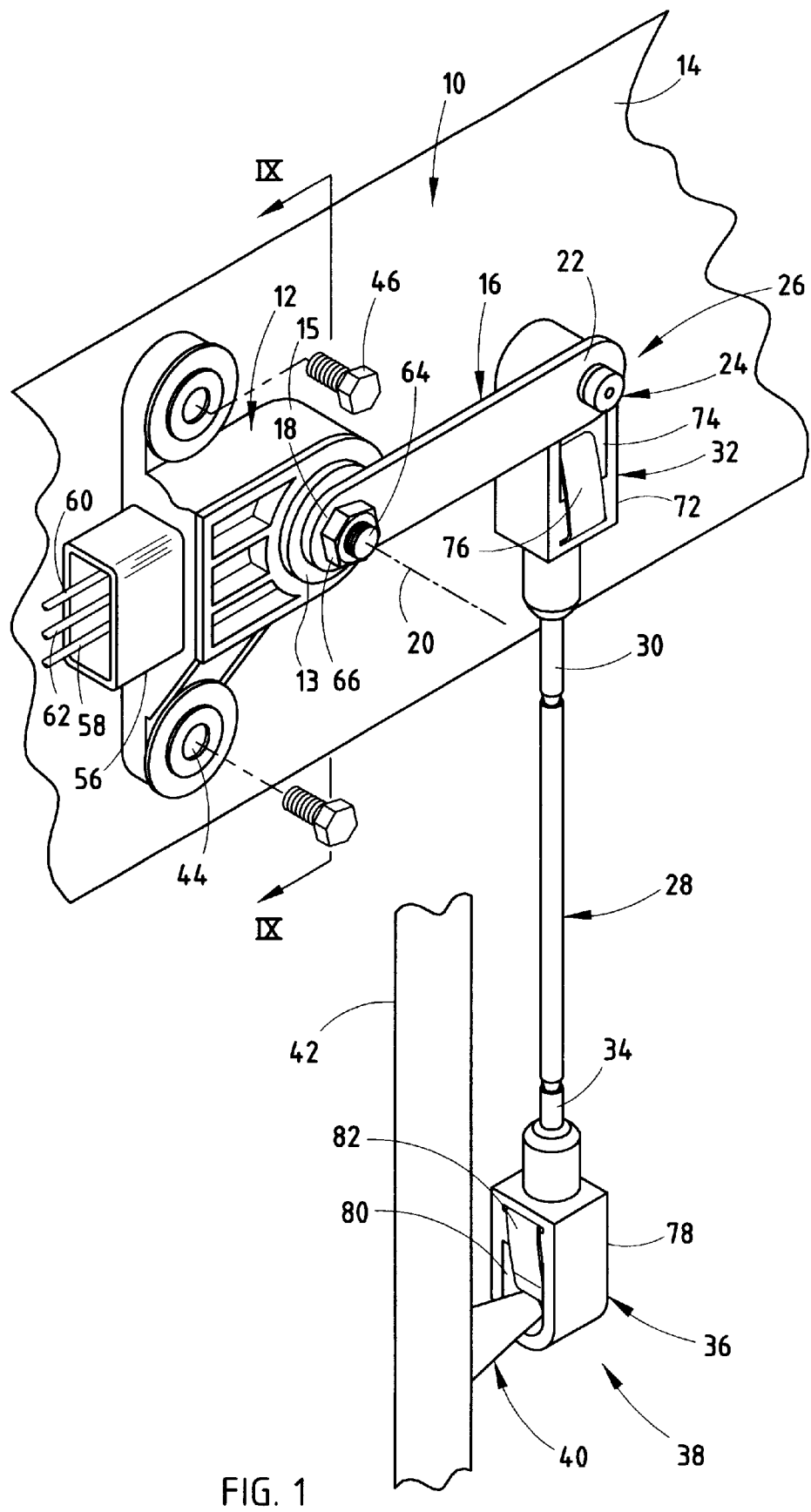
FIG. 1 is a perspective view of the sensor assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein art not to be considered as limiting, unless the claims expressly state otherwise.

Referring to FIG. 1, a rotary-type position sensor assembly embodying the present invention is shown designated by reference 10. In the illustrated embodiment, the sensor assembly 10 includes a sensor 12 that monitors angular position and which is fixedly attached to a first member 14. In the illustrated example, first member 14 includes a vehicle body or a portion thereof. The sensor assembly 10 also includes a first arm 16 having a first end 18 pivotally attached to sensor 12 at a pivot point 20. The first arm 16 also has a second end 22 that includes a first half 24 of a first universal joint 26. The sensor assembly 10 further includes a second arm 28 having a first end 30 that includes a second half 32 of first universal joint 26. The second half 32 of first universal joint 26 is pivotally attached to first half 24 of first universal joint 26. The second arm 28 also has a second end 34 that includes a first half 36 of a second universal joint 38. The sensor assembly 10 further includes a second half 40 of second universal joint 38 fixedly attached to a second member 42 and pivotally attached to first half 36 of second universal joint 38. In the illustrated example, second member 42 includes a vehicle suspension or chassis system, or portion thereof. The sensor 12 monitors the distance between first member 14 and second member 42, which is movable with respect to first member 14, by monitoring the angular position of first arm 16.

The sensor 12 is provided with a pair of mounting apertures 44 juxtaposed across sensor 12 and adapted to received mounting hardware such as bolts 46 therein. According to one embodiment, the sensor 12 is a Hall-effect type sensor as is well known in the art. The Hall-effect sensor 12 includes a Hall integrated circuit (IC) chip 48 centered between at least one north polarized magnet 50 and at least one south polarized magnet 52 as shown in FIGS. 5–7. The magnets 50 and 52 generate a magnetic flux as represented by arrows 54, which effects the electrical flow through the chip 48. The effect of the magnetic flux 54 on the electrical flow through chip 48 is dependent upon the direction of the magnetic field with respect to chip 48, as discussed below. Referring back to FIG. 1, sensor 12 also includes a female electrical lead quick connector 56 adapted to receive a corresponding male electrical lead connector (not shown). The connector 56 includes a power line 58 for providing power from a power source (not shown) to chip 48, a ground wire 60 for grounding chip 48, and a signal wire 62 providing electrical communication between chip 48 and a controller (not shown).

A source signal is delivered via power line 58 from the power source to chip 48. The signal travels through chip 48 where it is effected by the magnetic flux 54 being generated by magnets 50 and 52, thereby altering the electrical signal. The altered signal is then communicated to the controller via signal wire 62. In the present example, a source signal of five volts was used, however, various signal strengths may be utilized. With reference to FIG. 5, the chip 48 is calibrated such that at an engagement angle of 0° of the magnet flux 54 upon chip 48, or when the magnetic flux 54 is parallel with chip 48, the return power signal from the chip 54 is at a specific amount. In the illustrated example, the specific amount is 2.5 volts at 0° deflection as is shown in FIG. 8; however, other voltage levels may be utilized. In FIG. 6, at 45° of rotation of the magnets 50 and 52 with respect to chip 48, the magnetic flux 54 is at a 45° engagement angle relative to chip 48. Depending upon the direction of rotation of magnets 50 and 52 with respect to chip 48, the return voltage signal from chip 48 is either decreased or increased with respect to the return output voltage from chip 48 when magnets 50 and 52 are at a position of 0° rotation. In the illustrated example, the specific amounts are 0.50 volts and 4.50 volts depending upon the direction of rotation of the magnets 50 and 52 with respect to chip 48. In the illustrated example, the return voltage from sensor 12 increases or decreases depending upon the direction of rotation up to a maximum of 90° rotation, as shown in FIG. 7.

Figure 9:
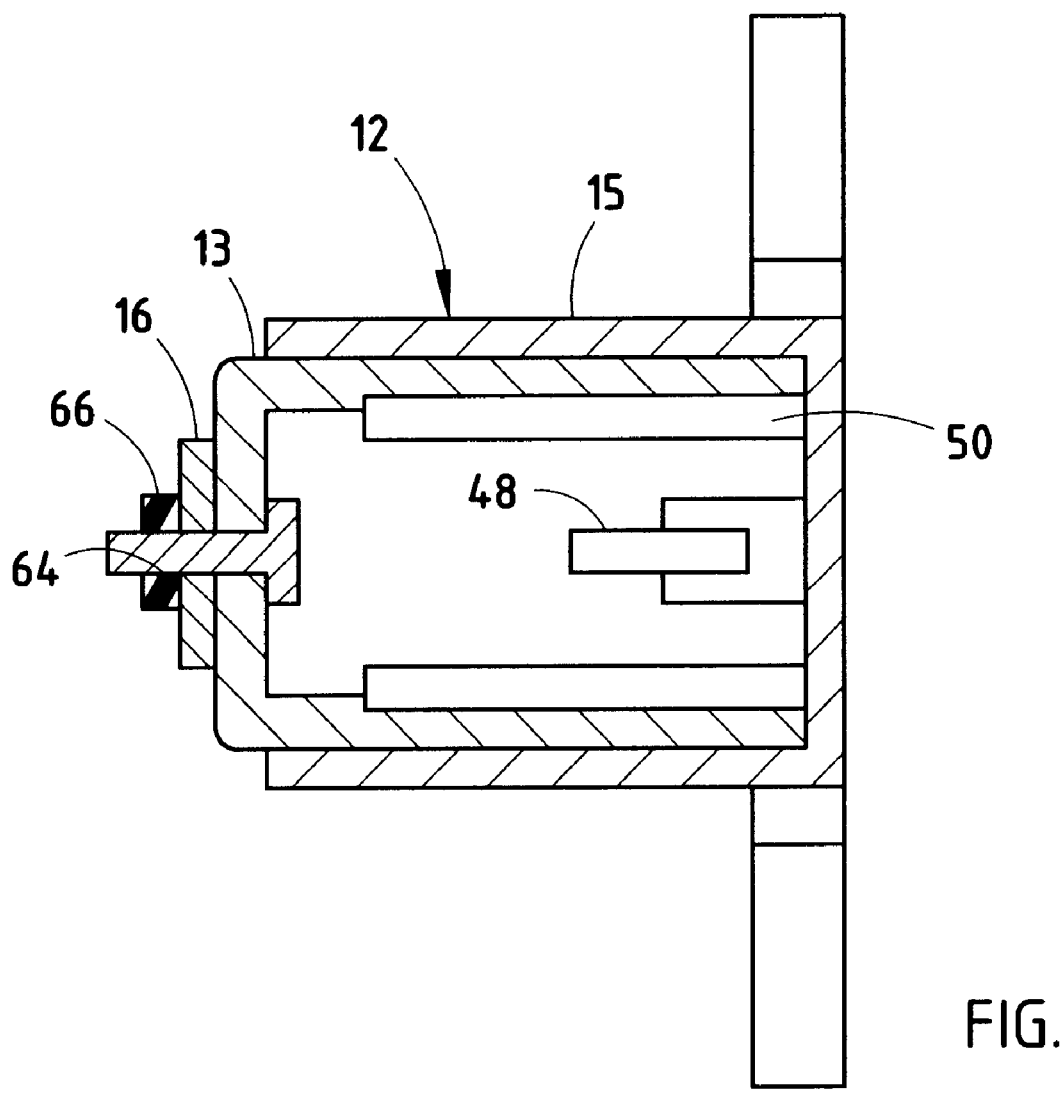
FIG. 9 is a cross-sectional side view of the sensor assembly.

The first or lever arm 16 of sensor assembly 10 is pivotally attached to sensor 12 by a pivot bolt 64 and held in connection therewith by a hexagonal nut 66. More specifically, lever arm 16 is fixedly attached to a sensor body 13 (FIG. 9) that is pivotally attached to a sensor housing 15. The pivot bolt 64 is attached to magnets 50 and 52 such that rotation of pivot bolt 64 results in a corresponding rotation of magnets 50 and 52 about pivot point 20. In the illustrated example, magnets 50 and 52 are fixedly attached to bolt 64 via a sensor body 13.

Figure 2A:
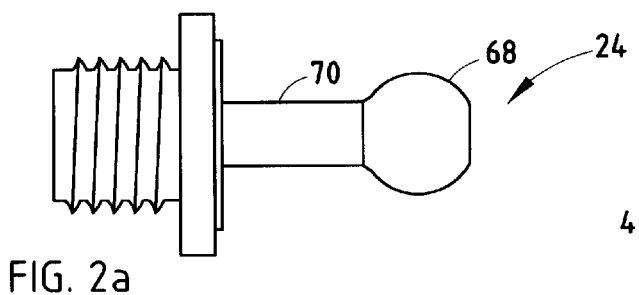
FIG. 2a is a front elevational view of a first ball of a first ball-and-socket joint.

As illustrated, the first universal joint 26 is provided in the form of a ball-and-socket type joint, however, any connection allowing pivotal motion in multiple planes may be used. As is more specifically shown in FIG. 2a, first half 24 of first universal joint 26 includes a ball 68 supported by a pedestal 70. In assembly, pedestal 70 is fixedly attached with first arm 16 such that ball 68 extends outwardly therefrom.

Figure 3:
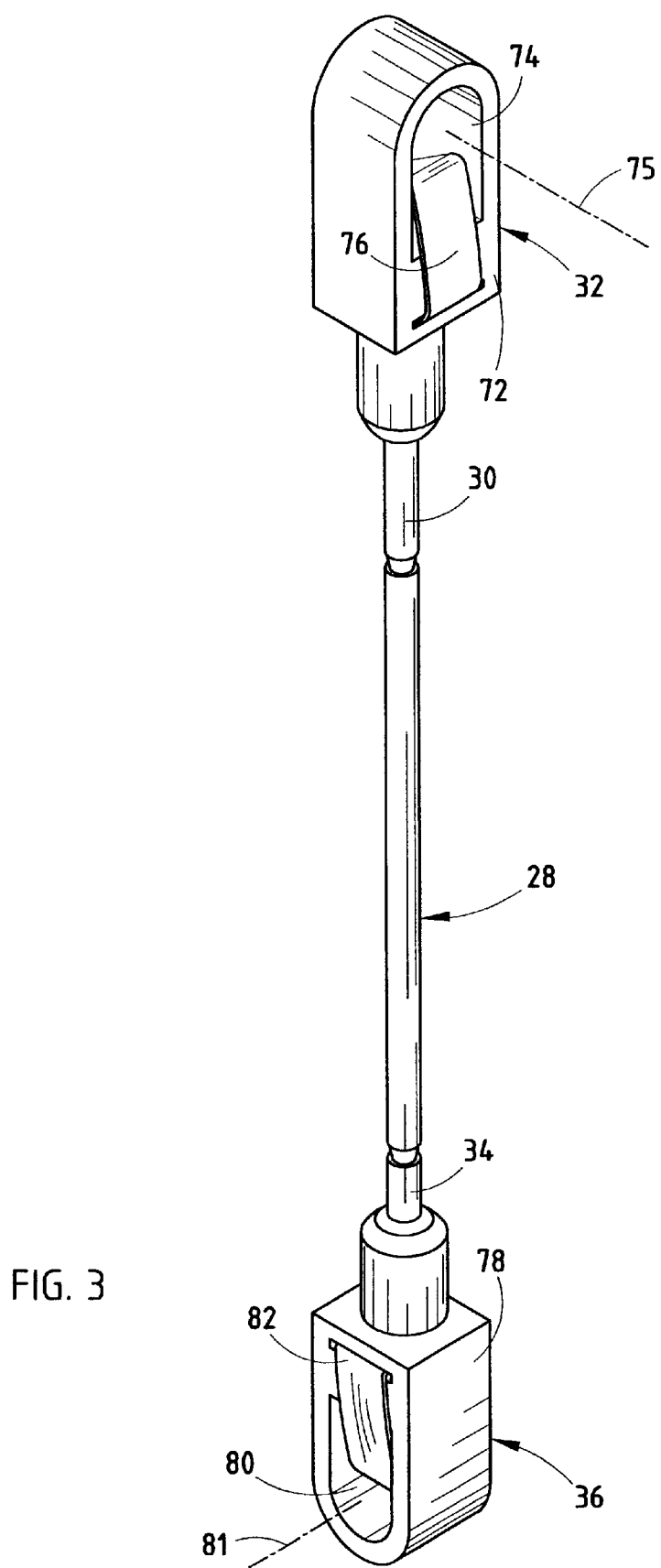
FIG. 3 is a perspective view of a linkage arm of the sensor assembly.

Referring to FIG. 3, the second arm 28 is cylindrically shaped and includes first end 30 and second end 34. Second arm 28 is constructed of steel and coated so as to be resistant to corrosion. An attachment member 72 is rotationally connected to first end 30, and defines second half 32 of first universal joint 26. Attachment 72 is constructed of a high strength plastic, however, other suitable materials may be utilized. In the illustrated example, second half 32 of first universal joint 26 includes a socket 74 defining a pivot axis 75 and adapted to pivotally receive ball 68 therein. Attachment member 72 also includes a flexible catch 76 that is adapted to releasbly retain ball 68 within socket 74. Flexible catch 76 is constructed of stainless steel, however, other suitable materials may be utilized. An attachment member 78 is rotationally attached to second end 34 of second arm 28, and defines first half 36 of second universal joint 38. Attachment member 78 includes a socket 80 which defines a pivot axis 81, and is constructed of a high strength plastic. Attachment member 78 also includes a stainless steel catch 82 similar to catch 76 of attachment member 72. It should be noted that while pivot axis 75 and pivot axis 81 are show as orthogonal with respect to one another, the angle between axis 75 and axis 81 may be altered between 0° and 359°.

Figure 2B:
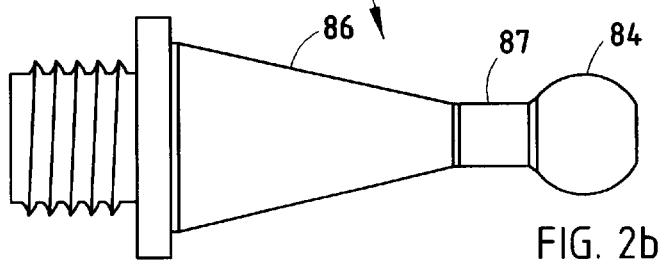
FIG. 2b is a front elevational view of a second ball of a second ball-and-socket joint.

As is illustrated in FIG. 2b, second half 40 of second universal joint 38 is provided as a ball 84 supported by a pedestal 86, thereby defining a reduced radius notch 87 therebetween. Pedestal 86 is fixedly attached to second member 42 such that ball 84 projects outwardly therefrom. Ball 84 is releasably retained within socket 80 by catch 82 engaging notch 87 of pedestal 86.

Figure 4:
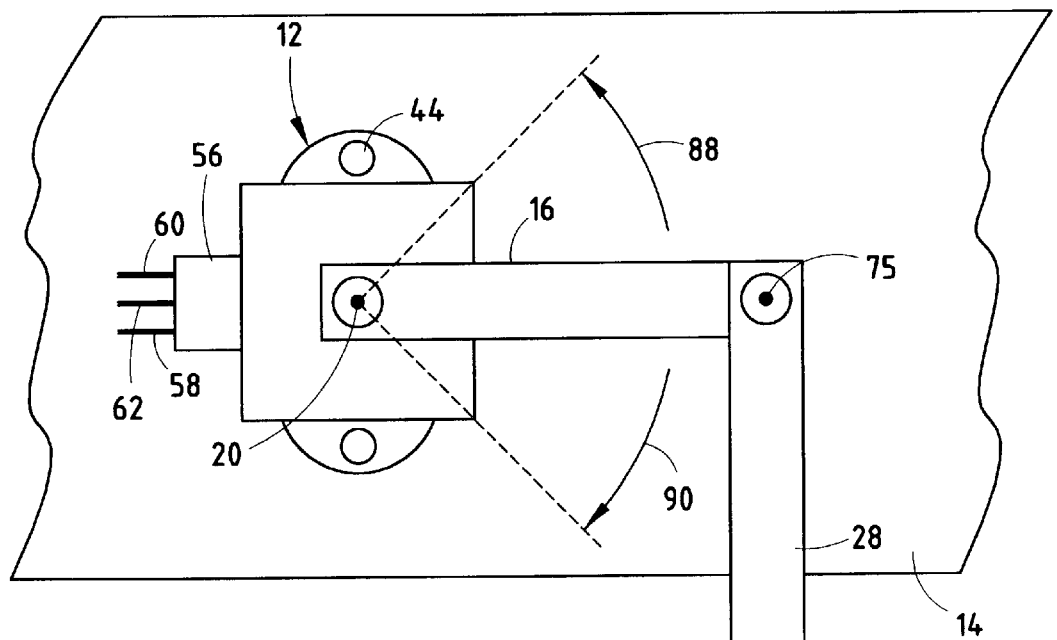
FIG. 4 is a schematic view of the sensor assembly.
Figure 4:
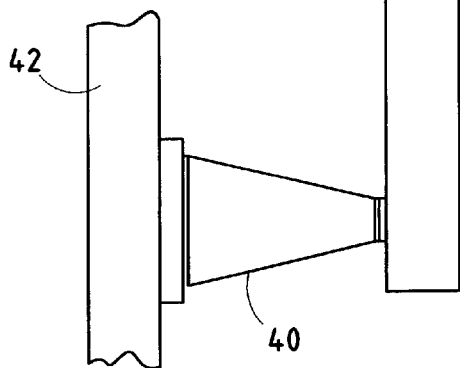

The operation of the sensor assembly 10 will now be described with reference to FIG. 4. The vehicle suspension system and second member 42 are compressed towards the vehicle body and the first member 14 as the vehicle is loaded with additional weight. This movement causes second arm 28 to press upwardly on first arm 16 at pivot point 75, thereby causing first arm 16 to rotate about pivot point 20 in a direction 88. The rotation of first arm 16 causes pivot bolt 64 and thus magnets 50 and 52 to rotate about chip 48, thereby altering the engagement angle of the magnetic flux 54 upon chip 48. The change in the engagement angle of the magnet flux 54 with chip 48 alters the return signal from sensor 12. This return signal may be used by the controller within the vehicle to determine the position of the second member 42 of the vehicle chassis or suspension system with respect to the first member 14 of the vehicle body. This information may then be used by the controller to adjust the position of the vehicle body with respect to the vehicle chassis or suspension system by engaging an air-type suspension system or another variable-type suspension system, thereby adjusting the level of the vehicle. The return signal from sensor 12 may also be used to adjust other systems within the vehicle such as being used to adjust servo motor-controlled headlights, thereby adjusting the angle of the projection of the headlights from the vehicle. In contrast, if a load is removed from within the vehicle, the second arm 28 exerts a downward force on first arm 16 at pivot point 75, thereby causing first arm 16 to pivot about pivot point 20 in a direction 90. The rotation of first arm 16 causes pivot bolt 64 and magnets 50 and 52 to again rotate about chip 48, thereby changing the engagement angle of the magnetic flux 54 upon chip 48. The change in the engagement angle of the magnetic flux 54 upon chip 48 again changes the return voltage signal from sensor 12, and may again be used to control and adjust numerous vehicle systems to compensate for the change in distance between the vehicle suspension system and the vehicle body.

The sensor assembly 10 provides a reduced cost, highly effective, universally adjustable sensing unit suitable for the proposed use. Further, the present invention provides a sensor assembly that may be used to monitor the motion of a component of a vehicle suspension system with respect to a component of a vehicle body, particularly wherein the components travel in a non-linear path with respect to one another.

In the foregoing description, it will be readily appreciated by those skilled in the art that modifications may be made to the invention without departing from the concepts disclosed herein. Such modifications are to be considered as included the following claims, unless these claims, by their language expressly state otherwise.

The invention claimed is:

1. An apparatus for monitoring the position of a vehicle suspension, comprising:
   a sensor that monitors angular position, the sensor being fixedly attached to one of a portion of a vehicle body and a portion of a vehicle suspension system;
   a first arm having a first end pivotally attached to the sensor, and a second end including a first ball;
   a second arm having a first end including a socket pivotally receiving the first ball, and a second end including a second socket; and
   a second ball fixedly attached to the other of the vehicle body and the portion of the vehicle suspension system not connected to the sensor, the second ball pivotally received within the second socket; and
   wherein the first socket and the second socket each define a centerline, wherein the centerline of the first socket and the second socket are substantially orthogonal to one another, and wherein the sensor monitors the distance between the portion of the vehicle body and the portion of the vehicle suspension system by monitoring the angular position of the first arm.

2. The apparatus of claim 1, wherein the sensor is fixedly attached to the portion of the vehicle body, and wherein the second ball is fixedly attached to the portion of the vehicle suspension system.

3. The apparatus of claim 1, wherein the sensor includes a Hall-effect type sensor.

4. An apparatus for monitoring angular position, comprising:
   a Hall-effect type sensor that monitors angular position, the sensor being fixedly attached to a first member;
   a first arm having a first end pivotally attached to the sensor, and a second end including a first portion of a first universal joint, wherein the first portion of the first universal joint includes a first ball;
   a second arm having a first end including a second portion of the first universal joint pivotally attached to the first portion of the first universal joint, wherein the second portion of the first universal joint includes a first socket that pivotally receives the first ball and a second end including a first portion of a second universal joint, wherein the first portion of the second universal joint includes a second socket; and
   a second portion of the second universal joint fixedly attached to a second member and pivotally attached to the first portion of the second universal joint, wherein the second portion of the second universal joint includes a second ball, the second member moveable with respect to the first member; and
   wherein the first socket and the second socket each define a centerline, the centerline of the first socket and the centerline of the second socket are substantially orthogonal to one another, wherein the sensor monitors the distance between the first member and the second member by monitoring the angular position of the first arm as the second member moves with respect to the first member in a manner to increase or decrease the distance therebetween.

5. The apparatus of claim 4, wherein the first member includes a portion of a vehicle body and the second member includes a portion of a vehicle chassis.

6. An apparatus for monitoring the position of a vehicle suspension, comprising:
   a Hall-effect type sensor that monitors angular motion, the sensor fixedly attached to a first member, wherein the first member includes a portion of a vehicle body;
   a first arm having a first end pivotally attached to the sensor, and a second end wherein the second end of the first arm includes a first half of a first universal joint, and wherein the first half of the first universal joint includes a first ball; and
   a second arm having a first end pivotally attached to the second end of the first arm, wherein the first end of the second arm includes a second half of a first universal joint attached with the first half of the first universal joint, and wherein the second half of the first universal joint includes a first socket that pivotally receives the first ball, and a second end pivotally attached to a second member, wherein the second end of the second arm includes a first half of a second universal joint, wherein the first half of the second universal joint includes a second socket, the second member includes a portion of a vehicle suspension system, a second half of the second universal joint pivotally attaches the second end of the second arm to the vehicle suspension system, and wherein the second half of the second universal joint includes a second ball pivotally received within the second socket, the second member moveable with respect to the first member; and
   wherein the first socket and the second socket each define a centerline, the centerline of the first socket and the center line of the second socket are substantially orthogonal to one another, and wherein the sensor monitors the distance between the first member and the second member by monitoring the angular position of the first arm as the first member and the second member move with respect to one another in a manner to increase or decrease the distance therebetween.

* * * * *